Feb. 14, 1933.  J. A. PECK  1,897,858
HYDRAULIC METER
Filed March 24, 1930  2 Sheets-Sheet 1

Inventor
Joseph A. Peck.
by Geo. H. Kennedy Jr.

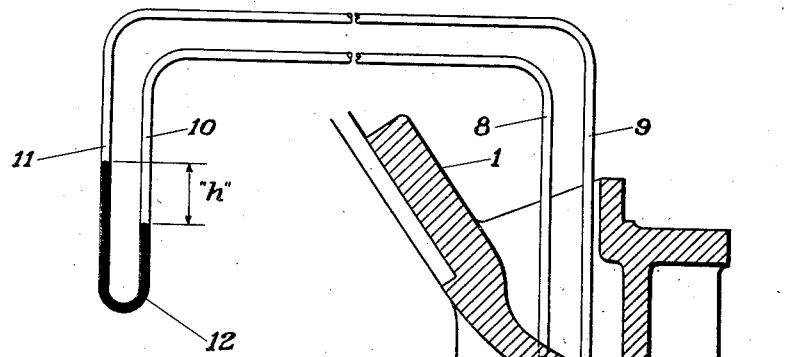
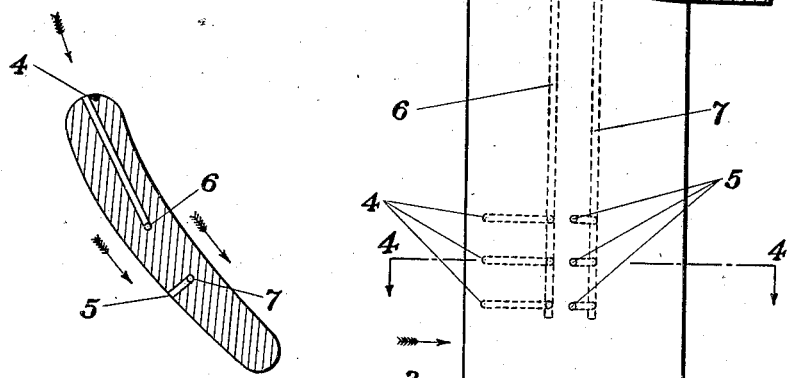
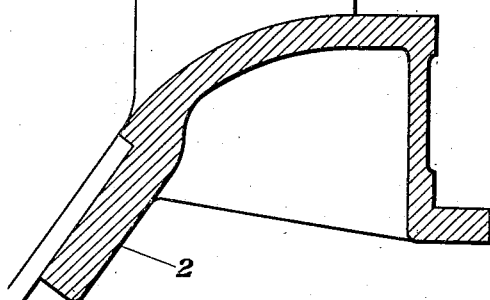

Patented Feb. 14, 1933

1,897,858

UNITED STATES PATENT OFFICE

JOSEPH A. PECK, OF WORCESTER, MASSACHUSETTS

HYDRAULIC METER

Application filed March 24, 1930. Serial No. 438,509.

The invention relates to meters for indicating the rate of flow of water or other fluid. Specifically, however, the invention operates by giving a pressure indication.
The invention is particularly adapted to hydraulic turbines and in that connection one of the objects of the invention is to provide an indicating apparatus that will give true flow indications on a pressure scale under widely different conditions.

Another object of the invention is to measure the flow by obtaining pressure differentials. The pressure differentials obtained are due to differences in the pressure of the stream at different points and not to differences of static pressure or "head". It will, therefore, be seen that it is a particular object of the invention to eliminate static pressure differentials and register only stream pressure differentials.

In order that the best results may be obtained, it is desirable that the place or places where the pressure is measured should be as close to the place where hydraulic energy is converted into mechanical energy as possible. It is desirable, therefore, to place the measuring apparatus in or near the turbine itself. Previous proposals along this line, however, have been found incapable of being carried into practical effect by reason of the fact that the terrific velocity of the water will not permit any substantial structure to be placed in the stream near the turbine. Furthermore a very substantial structure would interfere with the efficiency of the turbine itself.

The invention avoids these difficulties by locating the points of indication in structure already associated with the turbine. In other words, the apparatus is located in an already existing part of the turbine, and this is one of the main objects of the invention.

The above and other advantageous features of the invention will hereinafter more fully appear from the following detailed description, taken together with the accompanying drawings, in which:—

Fig. 3 is an enlarged fragmentary sectional view showing a portion of the aforesaid turbine element and the apparatus of the invention.

Fig. 4 is a horizontal sectional view of a vane or column, taken in the line 4, 4 of Fig. 3.

Fig. 5 is a representation of one type of indicating apparatus.

Like reference characters refer to like parts throughout the drawings.

Figure 1:
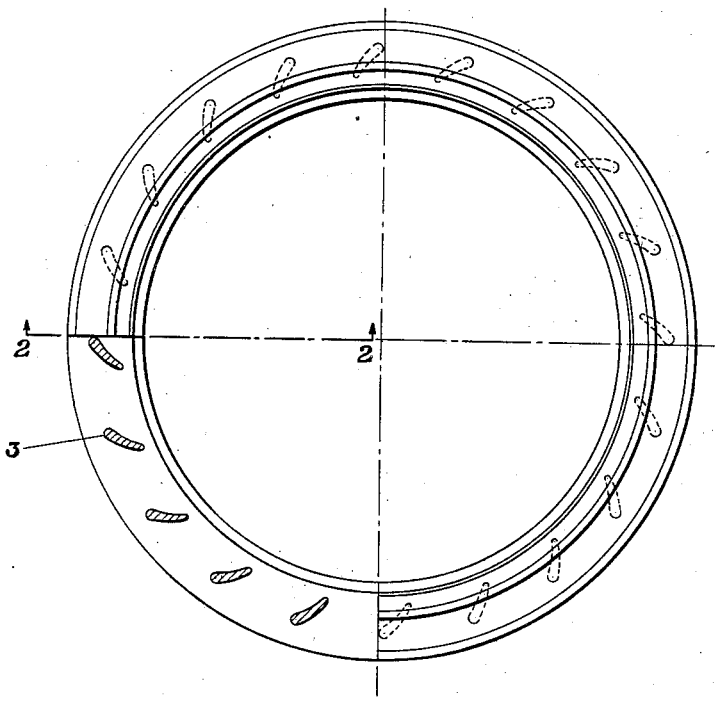
Fig. 1 is a view partly in plan and partly in horizontal section of one of the elements of a turbine.
Figure 2:
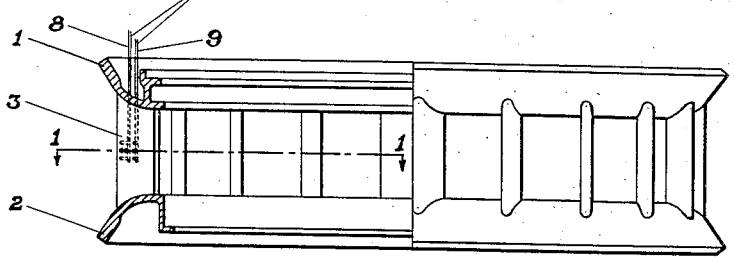
Fig. 2 is a view of the element shown in Fig. 1, partly in elevation and partly in section on the line 2, 2 of Fig. 1.

With reference to all the figures, the invention is shown applied to that element of a turbine which is commonly known as a "distributor" or "speed ring". This part of a turbine comprises a pair of spaced rings or annuluses 1 and 2 integrally united by a plurality of columns or vanes 3. It will be readily understood that the invention may be applied to other parts of a turbine, and is not limited in application to the distributor, nor to an element of the particular type shown in the drawings.

Referring now to Figs. 3 and 4, a plurality of holes 4 are bored in the front of one of the columns or vanes. A plurality of holes 5 are bored in the sides of one of the columns or vanes. These holes may be bored in the same vane as shown in Figs. 3 and 4, but this is not absolutely essential and they could be bored in different vanes.

The bores 4 are connected by a passage 6, and the bores 5 are connected by a passage 7. The passages 6 and 7 lead upward through their respective vanes and are connected to pipes 8 and 9. The pipes 8 and 9 are connected to opposite sides of any suitable form of pressure indicating or registering apparatus, such as a U-tube having legs 10 and 11 and containing a liquid 12, as shown in Fig. 5.

It is known in hydraulic kinetics that in a stream the pressure has a definite relation to the rate of flow, generally being approximately the reciprocal of it. There should be a greater pressure at the orifices of the bores 4 than at the orifices of the bores 5, from the location of the former orifices in the front of the vanes, and the location of the latter in the sides of the vanes. At all events it is essential only to place the orifices of these bores at places where the stream flow is different. The difference of pressure will be transmitted through the passages 6, 7 and pipes 8, 9 to the registering apparatus shown in Fig. 5, where the difference of the level $h$ will register the pressure differential between the respective sets of orifices.

It will be apparent that one bore 4 and one bore 5 would suffice, a plurality being used to distribute the points of flow indication and obtain not only greater accuracy, but also a greater rapidity of response to changes of flow.

Various modifications of the invention may be made including the location of the bores in different elements of a hydraulic motor, the scope of the invention being set forth in the following claims.

I claim,

1. In apparatus of the class described, a pressure indicating apparatus, a plurality of stationary turbine vanes past which the water flows, one of said vanes having an orifice therein past which the stream velocity is relatively high and a passage connecting said orifice to one side of said pressure indicating apparatus, one of said vanes having an orifice therein past which the stream velocity is relatively low and a passage connecting said latter orifice to the other side of said indicating apparatus.

2. In apparatus of the class described, an indicating apparatus, a turbine element having a plurality of vanes, one of said vanes having a plurality of orifices located at a point of relatively low fluid velocity and a passage connecting said orifices to one side of said apparatus, one of said vanes having a plurality of orifices therein at a point of relatively high fluid velocity and a passage connecting said latter orifices to the other side of said indicating apparatus.

3. In apparatus of the class described, an indicating apparatus, a vertical stationary turbine vane having a bore in the surface against which the water first impinges and a vertical passage therein connecting said bore to one side of said indicating apparatus, said vane further having a bore therein, with the opening of said second bore being horizontally spaced from said first bore and a vertical passage connecting said second bore to the other side of said indicating apparatus.

4. In apparatus of the class described, a single turbine vane past which the water flows, said vane having a pair of orifices therein, with one of said orifices located at a point of relatively low stream velocity, and with the other of said orifices at a point of relatively high stream velocity, and an indicating apparatus, said vane having passages therein connecting said orifices with opposite sides of said indicating apparatus.

5. In apparatus of the class described, a turbine vane having a plurality of bores therein, with the opening to said bores substantially perpendicular to the normal line of flow, said vane having a second plurality of bores therein, with the opening to said second plurality of bores substantially parallel to said normal line of flow, said vane being further provided with a longitudinal bore connecting the first plurality of bores and a second longitudinal bore connecting the second plurality of bores, a pipe connected to the first longitudinal bore, and a second pipe connected to the second longitudinal bore, and an indicating apparatus connected to said pipes.

6. In apparatus of the class described, a turbine vane having a bore therein, with the opening to said bore substantially perpendicular to the normal line of flow, said vane having a second bore therein, with the opening to said second bore substantially parallel to the normal line of flow, and an indicating apparatus, said vane being further provided with longitudinal bores connecting said first and second bores to said indicating apparatus.

JOSEPH A. PECK.